(12) United States Patent
Janosi et al.

(10) Patent No.: US 8,811,981 B2
(45) Date of Patent: Aug. 19, 2014

(54) METHOD, APPARATUS AND COMPUTER PROGRAM PRODUCT FOR RELAYING CAMEL RELATED MESSAGES IN A TELECOMMUNICATIONS NETWORK

(75) Inventors: Laszlo Janosi, Budapest (HU); Attila Molnar, Göd Kálmán u. 30 (HU); Andras Pasztor, Budapest (HU)

(73) Assignee: Nokia Siemens Networks OY, Espoo (FI)

( * ) Notice: Subject to any disclaimer, the term of this patent is extended or adjusted under 35 U.S.C. 154(b) by 305 days.

(21) Appl. No.: 13/127,269

(22) PCT Filed: Nov. 3, 2008

(86) PCT No.: PCT/EP2008/064857
§ 371 (c)(1),
(2), (4) Date: May 3, 2011

(87) PCT Pub. No.: WO2010/060452
PCT Pub. Date: Jun. 3, 2010

(65) Prior Publication Data
US 2011/0212719 A1 Sep. 1, 2011

(51) Int. Cl.
*H04J 3/16* (2006.01)
*H04W 4/18* (2009.01)

(52) U.S. Cl.
CPC ...................................... *H04W 4/18* (2013.01)
USPC ....................................... 455/432.1; 370/467

(58) Field of Classification Search
USPC ............ 455/432.1, 422.1; 370/466–467, 338, 370/410; 709/227
See application file for complete search history.

(56) References Cited

U.S. PATENT DOCUMENTS

| | | | | |
|---|---|---|---|---|
| 6,963,583 | B1 * | 11/2005 | Foti | 370/467 |
| 7,006,825 | B2 * | 2/2006 | Tornkvist | 455/432.1 |
| 7,664,494 | B2 * | 2/2010 | Jiang | 455/432.1 |
| 2003/0095566 | A1 * | 5/2003 | Bunting et al. | 370/465 |

(Continued)

FOREIGN PATENT DOCUMENTS

| | | |
|---|---|---|
| CN | 101163325 A | 4/2008 |
| EP | 1 217 816 A1 | 6/2002 |
| EP | 1 313 343 A1 | 5/2003 |

OTHER PUBLICATIONS

3rd Generation Partnership Project; Technical Specification Group core NEtwork and Terminals; Open Service Access (OSA); Stage 2 (Release 8); Jun. 1, 2008; pp. 1-33; No. V8.0.0; Mobile Competence Centre, 650, Route Des Lucioles, F-06921 Sophia-Antipolis Cedex, France.

(Continued)

*Primary Examiner* — Nizar Sivji
(74) *Attorney, Agent, or Firm* — Laurence A. Greenberg; Werner H. Stemer; Ralph E. Locher

(57) ABSTRACT

The present invention refers to a method, an apparatus and a computer program product for relaying CAMEL related messages in a telecommunication network, wherein received CAMEL related messages and corresponding subscriber data are analyzed (S3), the received CAMEL related messages are translated (S5) in non-Camel messages, the non-Camel messages are relayed (S6) to a service delivery framework on the basis of the ana-lyzing result and non-CAMEL responses are received (S8) from the service delivery framework. The non-CAMEL responses are re-translated into standard CAMEL operation responses (S9), which are sent to initiator of the received CAMEL related message (S11).

20 Claims, 3 Drawing Sheets

(56) References Cited

U.S. PATENT DOCUMENTS

| | | | |
|---|---|---|---|
| 2008/0108333 A1* | 5/2008 | Jemison et al. | 455/414.1 |
| 2009/0129372 A1* | 5/2009 | Pandey et al. | 370/352 |
| 2009/0170528 A1* | 7/2009 | Bull et al. | 455/456.2 |
| 2010/0128685 A1* | 5/2010 | Jiang | 370/329 |

OTHER PUBLICATIONS

PROTEI, Ltd.; "PROTEI CAMEL Gateway", 2006, p. 1-3, XP002578854, URL: <http://www.protei.com/products/mobile/CAMEL_Gateway/camel.gateway.pdf>.

* cited by examiner

METHOD, APPARATUS AND COMPUTER PROGRAM PRODUCT FOR RELAYING CAMEL RELATED MESSAGES IN A TELECOMMUNICATIONS NETWORK

BACKGROUND OF THE INVENTION

Field of the Invention

The present invention relates generally to a method, an apparatus and a computer program product for relaying CAMEL (Customized Applications for Mobile network Enhanced Logic) related messages in a telecommunications network, and more particularly, to a method, an apparatus and a computer program product for realizing web services as being location independent by relaying CAMEL operations in a visited network.

Third generation wireless networks are expected to enable a mobile internet to become reality, offering fast internet access and high speed data services to mobile subscribers. In order for network operators to allow for the rapid development of innovative value added applications on the scale seen in the internet today, the wireless core network needs to be opened for third party applications provided by e.g. independent software vendors. The $3^{rd}$ Generation Partnership Project (3GPP) is currently working on the production of technical specifications to provide a mechanism that would permit independent software vendors a standard interface to access network traditionally available to network operators themselves. Within 3GPP, this mechanism is commonly referred to as the Open Service Access (OSA).

Customized Applications for Mobile network Enhanced Logic also known as CAMEL was developed as standard for mobile intelligence across different kinds of vendor equipment for GSM (Global System for Mobile communications) network. This means that the end user should be able to roam between different networks (maybe in different countries) and be reachable at the same number and should receive only one bill from the original service provider, e.g. home operator.

Before CAMEL, the GSM networks used INAP (Intelligent Network Application Part) for injecting intelligence into GSM networks. The limitations of INAP was that it did not support mobility management. CAMEL solved the mobility management problem and provided with much more functionality.

In a typical CAMEL architecture, a Mobile Switching Center (MSC) sends a message that queries the Service Control Point (SCP) data base. In the data base the instructions needed for an intelligent application are stored. The Mobile Switching center Server (MSS) is a state of the art solution for mobile circuit switched or line switched networks. Together with a Multimedia GateWay (MGW) it provides the separation of control plane, i.e. signaling, and user plane, i.e. bearer, and the support of IP (Internet Protocol) and ATM (Asynchronous Transfer Mode) bearers to transfer circuit switched voice and data. Thus, it helps operators in saving OPerating EXpenses (OPEX). In this architecture a gsmSCF (GSM Service Control Function) is a functional entity that implements service logic which is used to execute CAMEL services.

In the near future Mobile Switching center Servers (MSS) are expected to implement so-called Web Services Interface (WSI) or other interfaces in order to have the capability of joining to web service execution environments. The web services for circuit switched mobile subscribers will re-use and extend the current service capabilities of circuit switched mobile networks. If a circuit switched mobile subscriber has e.g. web service subscribed then that service shall be executed in the home environment (e.g. home network) in a Mobile Switching center Server (MSS) that has Web Service Interface (WSI) to the web server that implements the service logic.

Even when the subscriber is attached to a Mobile Switching Center (MSC) which does not have an interface to the web server or the subscriber roams in a foreign Public Land Mobile Network (PLMN), it is a basic requirement to have the same user experience as if the subscriber were registered in a WSI-capable MSC Server (MSS). Moreover, in particular web services are location independent, i.e. accessible with web browsers from any point in the world, which further emphasizes this requirement.

Currently, this problem could be solved with a so-called "CAMEL homing service". That is, in a mobile originating case the gsmSCF could force the call to be routed to the home network by "connect operation" and then the MSC Server (MSS) in the home network could trigger gsmSSF (GSM Service Switching Function) to contact the gsmSCF which would then execute the subscriber's service and would trigger the execution of web services over the Web Service Interface (WSI). On the other hand, in a mobile terminating call case optimal routing should be disabled, so the call would be routed always to the home PLMN in order to execute HLR (Home Location Register) inquiry, so the subscriber's terminating services could be executed in the home PLMN always. This solutions always force establishment of so-called "call legs" (control plane and user plane as well) from VPLMN (Visited Public Land Mobile Network) to HPLMN (Home Public Land Mobile Network) which utilizes inter-PLMN resources in a sub-optimal manner.

BRIEF SUMMARY OF THE INVENTION

It is, therefore, a need in the prior art to provide a method, an apparatus and a computer program product for relaying CAMEL related messages in a circuit switched network which enables further interfaces, in particular when implementing web services interface, and a same look and feel experience is given to a user even when roaming to a visited network.

According to the present invention this need is accomplished by the independent claims.

According to an embodiment of the present invention there is provided a method for relaying CAMEL related messages in a telecommunication network comprising the steps of analyzing a received CAMEL related message and corresponding subscriber data; translation of the CAMEL related message into a non-CAMEL message; relaying said non-CAMEL message to a service delivery framework on the basis of the analyzing result; receiving a non-CAMEL response from the service delivery framework; re-translation of the non-CAMEL response into a standard CAMEL operation response; and sending the re-translated response to initiator of said received CAMEL related message.

According to a further embodiment of the present invention there is provided an apparatus for relaying CAMEL related messages in a telecommunication network comprising: a service broker component for receiving CAMEL related messages and corresponding subscriber data and an analyzing component for analyzing said CAMEL related messages and subscriber data, wherein said service broker component includes a translator unit to translate the CAMEL related message into a non-Camel message, a relay unit to relay the non-CAMEL message to a service delivery framework on the basis of analyzing result, and a re-translator unit to re-translate a non-CAMEL response received from the service delivery framework into a standard CAMEL operation response, wherein the relay unit sends the re-translated response to initiator of said received CAMEL related message.

Moreover, according to the present invention there is provided a computer program product for performing the above-mentioned method steps.

According to the present invention unnecessary homing of subscribers' calls can, thus, be avoided, and in this way inter-PLMN interconnections can be spared for those services which do not require the handling of user plane in the HPLMN. Moreover, VPLMN specific information which is received e.g. in IDP (Initial Detection Point), such as location number, cell ID, etc., are available in the home MSC Server when executing services. Thus, home-based web services are executed at low cost and in an effective way.

The further subclaims refer to specific embodiments of the present invention.

The foregoing has outlined rather broadly the features and technical advantages of embodiments of the present invention in order that a detailed description of the invention that follows may be better understood. Additional features and advantages of embodiments of the invention will be described hereinafter, which form the subject of the claims of the invention. It should be appreciated by those skilled in the art that conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE SEVERAL VIEWS OF THE DRAWING

For a more complete understanding of the present invention and of the advantages thereof, reference is now made to the following description taken in conjunction with the accompanying drawings, in which.

DESCRIPTION OF THE INVENTION

Figure 1:
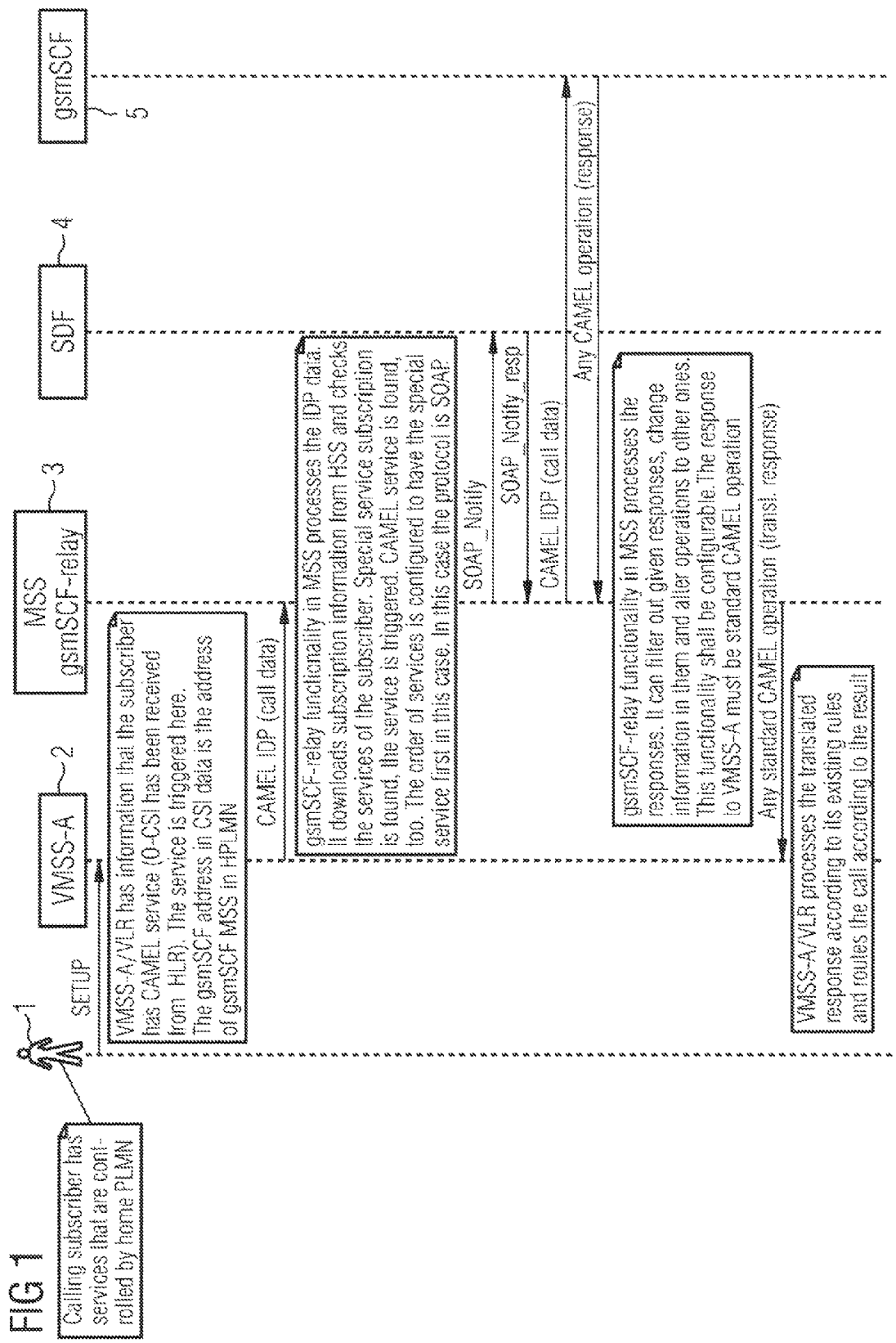
FIG. 1 illustrates a simplified status diagram of a CAMEL relay function scenario.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific way to make and use the invention, and do not limit the scope of the invention. Moreover, same reference signs refer to same technical features if not stated otherwise. As far as "may" is used in this application it means the possibility of doing so as well as the actual technical implementation.

The present invention will be described with respect to a preferred embodiment in a specific context, namely the implementation of Web Services Interface (WSI) or other interfaces in order to have the capability of joining to web service execution environments. In detail, the present invention is described in connection with specific CAMEL operations as CAMEL related messages in order to realize the CAMEL relay function according to the present invention. The invention may also be applied, however, to other interfaces and other CAMEL related messages in Intelligent Networks (IN) which might realize service execution in a visited network in a similar or a same way as in a home network.

In the following some technical terms are specified, which are used throughout the following description. In detail, a CAMEL Service Environment (CSE) is a logical entity which processes activities related to Operator Specific Services (OSS). CAMEL Subscription Information (CSI) identifies that CAMEL support is required for the subscriber and the identities of the CSEs to be used for that support. The service Control Function (SCF) contains the actual independent service logic to apply to the call. A Basic Call State Model (BCSM) represents an abstract view of call processing, seen from the perspective of service feature control performed by the SCF. The BCSM consists of two sets of call processing logic, i.e. Originating BCSM (O-BCSM) and Terminating BCSM (T-BCSM). Points In Call (PIC) are defined by standards to represent those points in which action might be taken. They provide a view of a state or event in which call processing logic may initiate an action, such as suspension of call processing while a data base is queried. Detection Points (DP) represent transitional events that occur between some PICs. An Initial Detection Point indicates an initiator. A trigger is the term used to define specific call-processing logic associated with a given Point In Call. Triggers may be understood as software logic that is loaded in a network element to carry out instructions to initiate an Intelligent Network (IN) process based on analysis of conditions at a Detection Point (DP). Unlike a trigger which depends on some form of input criteria an event is simply a call occurrence such as "no answer", "busy signal" or "call termination". The GSM Service Control Function (gsmSCF) is a functional entity that contains the CAMEL service logic to implement Operator Specific Services (OSS). It interfaces with the gsmSSF, the gsmSRF and the HLR. The GSM Service Switching Function (gsmSSF) is a functional entity that interfaces the MSC or GMSC to the gsmSCF. The concept of the gsmSSF is derived from an IN SSF, but uses different triggering mechanisms because of the nature of the mobile network. The GSM Specialized Resource Function (gsmSRF) is a functional entity which provides various specialized resources. It interfaces also with the gsmSCF and with the MSC. Finally, the HLR represents the Home Location Register in a telecommunications network according to the present invention.

According to the present invention a mobile subscriber in a circuit switched telecommunication network who may have service to be executed in the e.g. Home Public Land Mobile Network (HPLMN) may have to be configured with O-CSI (Originating CAMEL Subscription Information) and (V) T-CSI ((Visited) Terminating CAMEL Subscription Information) in subscription data in the HLR. In both CSI, i.e. the O-CSI and the (V) T-CSI the gsmSCF address is the address of an MSC Server (MSS) in the HPLMN which may have CAMEL relay function according to the present invention implemented. When the subscriber roams abroad, i.e. into a different network, the HLR may send the CSI together with other subscription data to the visited location register (VLR) in so-called "insert subscriber data" operation.

In case the subscriber originates a call the O-CSI may be triggered by the visited MSC. The IDP (Initial Detection Point) operation may be routed to the MSC Server in the HPLMN based on the gsmSCF address in the O-CSI. The MSC Server in the HPLMN may receive this IDP operation and may analyze the situation with its internal service logic. On the one hand it may translate and relay the IDP operation (with or without changes) to a real gsmSCF or service delivery framework (SDF). On the other hand it may trigger the services which required the interaction of the home network, e.g. web services over WSI.

As a matter of course the MSC Server may even skip relaying of the IDP operation to the gsmSCF or SDF on the basis of an analyzing result within its internal logic.

Based on the responses received from the gsmSCF or SDF, e.g. a web server, the MSC Server may execute an optional filtering logic and re-translates the received responses as standard CAMEL operations to the visited MSC in the VPLMN. The optional filtering may be configurable by an operator e.g. of the mobile network in order to have a flexible decision logic.

The same logic applies when the user has incoming calls. In this case (V) T-CSI is triggered and the e.g. IDP operation may be sent to an MSC Server in the HPLMN which then may execute the service and relays the IDP-operation and/or other CAMEL operations to the gsmSCF or SDF.

FIG. 1 illustrates a simplified status diagram of a typical scenario for implementing the present invention.

According to FIG. 1 a calling subscriber 1 has services that may be controlled by the HPLMN (Home Public Land Mobile Network). This includes that the mobile subscriber has made a subscription for CAMEL-service.

After sending a SETUP-message to a Visited Mobile Switching center Server for an A-party, i.e. calling party, (VMSS-A) 2 this visited server 2 has information that the subscriber may have CAMEL service. In detail, the O-CSI may have been received from the HLR including these data. A respective service may be triggered by this server 2 and the gsmSCF address in the CSI data may be the address of the gsmSCF MSS (Mobile Switching center Server) in the related HPLMN.

According to FIG. 1, the visited server 2 may send a CAMEL related message, e.g. a CAMEL operation, including the call data to a Mobile Switching center Server (MSS) 3 in the home network which includes the gsmSCF-relay functionality. In particular, a CAMEL IDP message may be sent to the MSS 3, to submit these call data. In the MSS 3 a respective gsmSCF-relay functionality (not shown) processes the received IDP data. Moreover, it may download subscription information from the HSS and checks the services of the subscriber. The HSS defines the Home Subscriber Server which includes the so-called Home Location Register (HLR).

In case special service subscription is found, the service is triggered. Moreover, CAMEL service may be found too in these data. The order of the services may be configured to have the special service first in this case. According to the present invention the protocol used may be Simple Object Access Protocol (SOAP).

Thus, the MSS server 3 translates a received CAMEL message into a non-CAMEL message, e.g. SOAP message, and sends a SOAP_NOTIFY message to a Service Delivery Framework (SDF) 4 which sends back a non-CAMEL response "SOAP_NOTIFY_resp". Moreover, the MSS 3 may send the CAMEL operation "CAMEL IDP" with calling data to the network element 5, which provides gsmSCF functionality. The network element 5, i.e. the respective gsmSCF may respond with any CAMEL operation to the MSS 3.

The gsmSCF-relay functionality within the MSS 3 processes now these received responses. It may filter out given responses, change information in them and alter operation to other ones. This functionality may be configurable by an operator.

In particular, the gsmSCF-relay functionality of the MSS 3 re-translates the responses from the service delivery framework (SDF) 4, i.e. non-CAMEL operations, into standard CAMEL operations which are sent as responses to the visited server 2. The responses received from the network element 5 including gsmSCF functionality do not need such a re-translation since they include already standard CAMEL operations. Thus, the response sent from the MSS 3 to the Visited Mobile Switching center Server 2 is always a standard CAMEL operation, i.e. a response without re-translation from the gsmSCF or a re-translated response of the service delivery framework (SDF) 4.

Finally, according to FIG. 1, the visited server 2 of the calling party (A-party) processes these received responses according to its existing rules and routes the call according to the result.

Thus, according to the present invention the same user experience may be realized e.g. for web services in an easy and cost effective way. Moreover, there is no need of so-called "call legs" which utilizes inter-PLMN resources in a sub-optimal manner. Thus, web-based services are provided to a subscriber even if in a visited network in the same way as in the home network.

Figure 2:
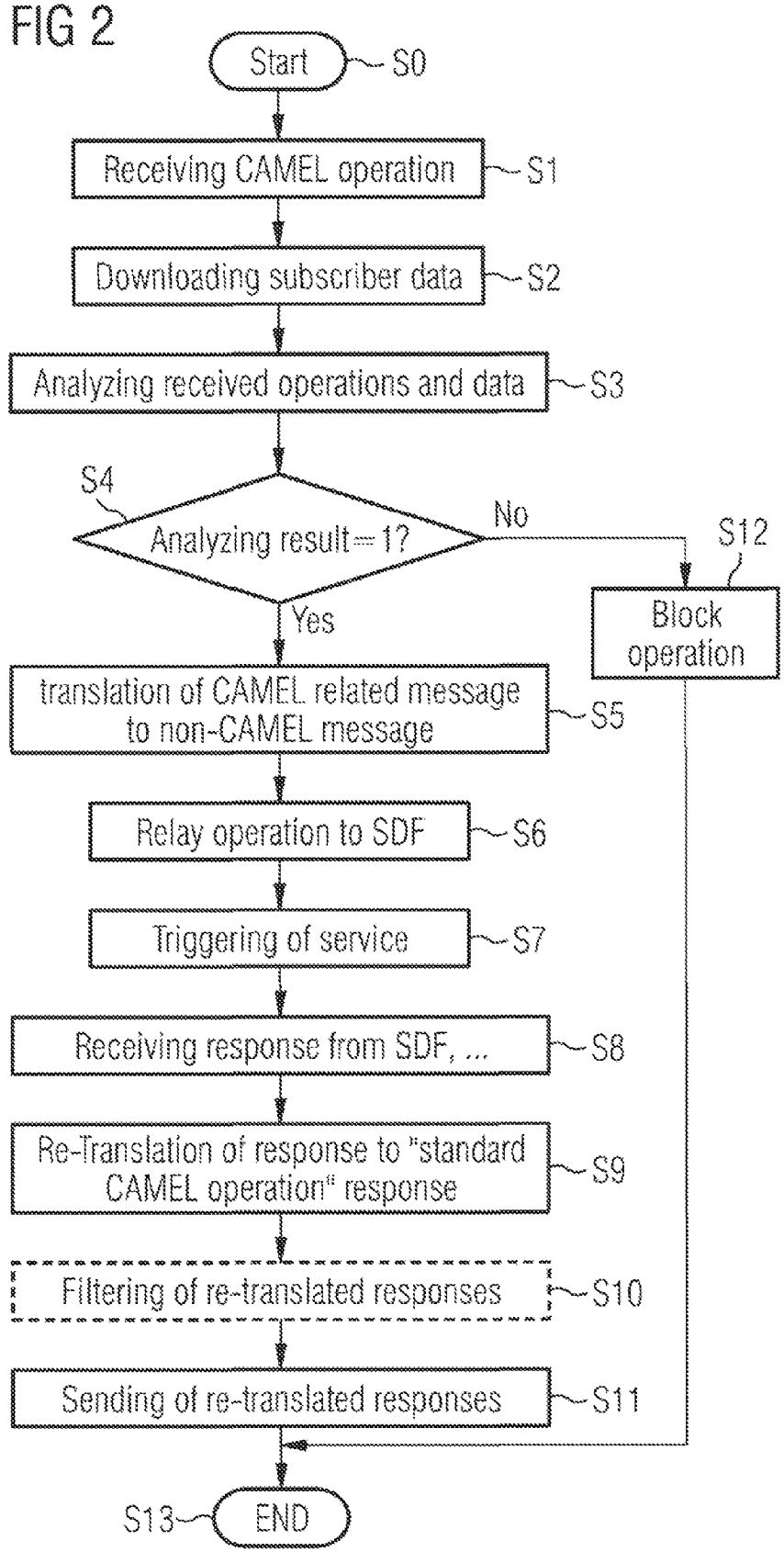
FIG. 2 illustrates a simplified flowchart of a method for relaying CAMEL related messages in a telecommunication network.

FIG. 2 illustrates a simplified flowchart of the method for relaying CAMEL operations in a telecommunication network according to the present invention. Preferably the method may be implemented in the Mobile Switching center Server 3 having the gsmSCF-relay functionality. In detail, the CAMEL interface of the MSC Server 3 may be enhanced in order to be able to process incoming CAMEL operations, such as IDP operation (Iinitial Detection Point) or ERB operation (Event Request BCSM), which were only originated from an MSC server so far.

Thus, according to FIG. 2, in a step S1 CAMEL related messages are received, such as IDP-, ERB- and other CAMEL operations. In step S2 corresponding subscriber data may be downloaded from a repository without performing location canceling in the VPLMN. In step S3 the content of the received CAMEL operations are analyzed together with the subscriber data. According to the present invention this analysis may be configurable by an operator, such as the operator of the network. In a step S4 the analyzing result of step S3 is evaluated. According to this analyzing result the flowchart either proceeds to step S5 or to step S12.

In detail, in step S5 a translation of the received CAMEL operation into a non-CAMEL operation is made. According to the present invention the protocol used for the service delivery framework may be Simple Object Access Protocol (SOAP). In a step S6 the non-CAMEL operation may be relayed to the service delivery framework 4 or according to step S12 it may be blocked on the basis of the analyzing result. Optionally the received CAMEL operations may be relayed to the gsmSCF 5, e.g. CAMEL IDP (call data) (see FIG. 1). Those services of the subscriber which require the interaction of the home network may be additionally executed in step S7. In detail, a web service may be triggered over the Web Service Interface (WSI) to execute this service. In a step S8 the responses from the gsmSCF/or other service logic execution environments, e.g. a web server, may be received.

In a step S9 a re-translation of these received responses is made to "standard CAMEL operations" responses, in case the received responses are non-CAMEL responses coming from e.g. the service delivery framework. In detail, the received responses may be mapped from non-CAMEL interfaces to "standard CAMEL operations". In case the responses are received from the gsmSCF no re-translation is necessary since it submits already standard CAMEL operations.

In an optional step S10 the re-translated responses may also be filtered. In detail, the translated responses may be filtered based on analyzing the data of the responses. Moreover, this analysis may be configurable for the operator. It should be noted that alternatively the filtering of the responses may happen based on analysis also before the re-translation in step S9. Finally, in step S10 the re-translated responses are sent to the initiator of the CAMEL operations received in step S1. The flowchart ends in step S13.

Figure 3:
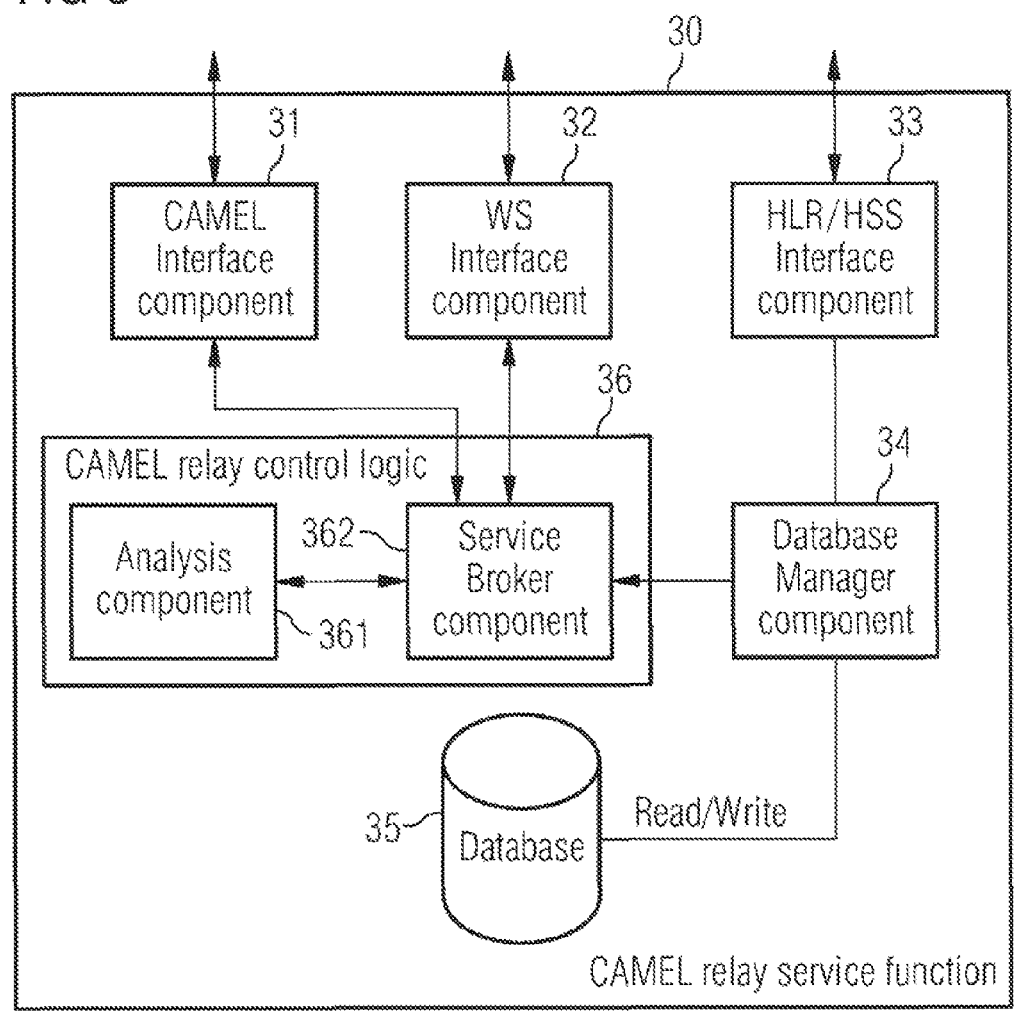
FIG. 3 a simplified block diagram of an apparatus for relaying CAMEL related messages in accordance with an embodiment of the present invention.

FIG. 3 illustrates a simplified block diagram of a CAMEL relay service function which may be implemented in a Mobile Switching center Server according to the present invention.

According to FIG. 3 the CAMEL relay service function 30 includes a CAMEL interface component 31, a WS interface component 32 and a HLR/HSS interface component 33. The CAMEL interface component 31 is responsible for receiving and sending CAMEL related messages, such as IDP, ERB or other CAMEL operations. The WS interface component may be responsible for receiving and sending Web Service interface related messages. The HLR/HSS interface component may be responsible for implementing the interface towards the Home Location Register (HLR) or Home Subscriber Server (HSS) respectively (MAP or Sh interface) and may include the sending and receiving of related messages.

Moreover, the CAMEL relay service function 30 includes a Database Manager component 34 and a Database 35. The Database Manager component 34 may be responsible for handling HLR/HSS inquiry logic, storing the retrieved subscriber information in the Database 35 and providing that information for a CAMEL relay control logic 36. The CAMEL relay logic 36 realizes the CAMEL relay functionality of the present invention and includes substantially a Service Broker component 362 and an Analysis component 361.

The Service Broker component 362 may receive messages from the CAMEL interface component 31 and the WS interface component 32. Moreover, it may inquire subscriber data from the Database Manager component 34 and provides data to and controls the execution of the Analysis component 361. Based on the analysis result coming out of the Analysis component 361 the Service Broker component 362 may require also the sending of messages from the CAMEL interface component 31 and the WS interface component 32.

The Analysis component 361 realizes the analysis of the data provided by the Service Broker component 362. Its execution may be fully controlled by the Service Broker component 362 and it is particularly able to analyze information received from the CAMEL interface component 31 and the WS interface component 32. The analyzing results of the Analysis component 361 may be used by the Service Broker component 362 during relay logic execution as well as data collection.

The method according to FIG. 2 may be substantially realized by the CAMEL relay control logic 36 shown in FIG. 3. In detail, a translator unit (not shown) translates a received CAMEL related message to a non-Camel message, a relay unit (not shown) relays the non-Camel message to a service delivery framework on the basis of the analyzing result of the analysis component 361, and a re-translator unit (not shown) re-translates a non-CAMEL response received from the service delivery framework into a standard CAMEL operation response, wherein the relay unit sends the re-translated response to initiator of the received CAMEL related message.

Thus, unnecessary homing of subscribers' calls can be avoided and on this way, inter-PLMN interconnections can be spared for those services which do not require the handling of user plane in the HPLMN. Moreover, VPLMN specific information which is received in the e.g. IDP, such as location number, cell ID, etc., are available now also in the home MSC server when executing the services.

FIG. 2 illustrates a flowchart of a method and computer program product according to the present invention. It will be understood that each block or step of the flowchart and combinations of blocks in the flowchart can be implemented by computer program instructions. These computer program instructions may be loaded into a computer or another programmable apparatus to produce a machine, such that the instructions which are executed on the computer or other programmable apparatus create means for implementing the function specified in the blocks or steps of the flowchart. These computer program instructions may also be stored in a computer readable memory, e.g. DVD, CD, diskette, that can direct a computer or other programmable apparatus to function in a particular manner. Moreover, these computer program instructions may be downloaded in e.g. a telecommunication network to cause operational steps to be performed on the computer or other programmable apparatus to produce a computer implemented process such that the instructions which execute on the computer or other programmable apparatus provide steps for implementing the functions specified in the blocks or steps of the flowchart.

Accordingly, blocks or steps of the flowchart support combinations of means for performing the specified functions, combinations of steps for performing the specified functions and program instruction means for performing the specified functions. It will also be understood that each block or step of the flowchart and combinations of blocks or steps in the flowchart can be implemented by special purpose hardware based computer systems which perform the specified functional steps or combinations of the special purpose hardware and computer instructions.

Although embodiments of the present invention and their advantages have been described in detail, it should be understood that various changes, substitutions and alterations can be made therein without departing from the spirit and scope of the invention as defined by the appended claims. For example, it will be readily understood by those skilled in the art that many of the features, functions, processes and methods described herein may be varied while remaining within the scope of the present invention. Moreover, the scope of the present application is not intended to be limited to the particular embodiments of the system, apparatus, method or steps described in the present invention. As one of ordinary skill in the art will readily appreciate from the disclosure of the present invention system, apparatuses, methods or steps presently existing or to be developed later, that perform substantially the same function or achieve substantially the same result as the corresponding embodiments described herein may be utilized according to the present invention. Accordingly, the appended claims are intended to include within their scope such apparatuses, methods or steps.

REFERENCE LIST 1 subscriber
2 visited mobile switching center server
3 mobile switching center server including gsmSCF-relay functionality
4 service delivery framework
5 network element providing gsmSCF 30 CAMEL relay service function
31 CAMEL interface component
32 WS interface component
33 HLR/HSS interface component
34 database manager component
35 database
36 CAMEL relay control logic
361 analysis component
362 service broker component
S1-S12 method steps

The invention claimed is:

1. A method for relaying CAMEL-related messages in a telecommunication network, the method which comprises:
    analyzing at a mobile switching center server (MSS) in a home network a received CAMEL-related message and corresponding subscriber data;
    on a basis of a result obtained in the analyzing step:
    translating the CAMEL-related message into a non-CAMEL message,
    relaying the non-CAMEL message to a service delivery framework;
    receiving a non-CAMEL response from the service delivery framework at the mobile switching center server (MSS) in the home network;
    re-translating the non-CAMEL response into a standard CAMEL operation response at the MSS in the home network; and
    sending the translated response to an initiator of the received CAMEL-related message in a visited network.

2. The method according to claim 1, which comprises alternatively blocking the received CAMEL-related message on the basis of the result of the analyzing step.

3. The method according to claim 1, which further comprises triggering a service, which requires an interaction with a home network.

4. The method according to claim 1, wherein the re-translation step comprises mapping received responses from non-CAMEL interfaces to responses with standard CAMEL operations.

5. The method according to claim 4, further comprising a step of filtering the translated responses on the basis of analyzing the data of the responses.

6. The method according to claim 5, wherein the analyzing of the responses is configurable by an operator.

7. The method according to claim 1, wherein the relaying step includes changing the non-CAMEL messages.

8. The method according to claim 1, wherein the CAMEL-related message is an IDP or ERB operation.

9. The method according to claim 1, wherein the telecommunication network is a mobile circuit switched network.

10. An apparatus for relaying CAMEL-related messages in a telecommunication network, the apparatus comprising:
    a service broker component for receiving CAMEL-related messages and corresponding subscriber data; and
    an analyzing component for analyzing the CAMEL-related messages and subscriber data;
    said service broker component being part of a mobile switching center server (MSS) of a home network, said service broker component including a translator unit to translate a received CAMEL-related message to a non-CAMEL message based on an analyzing result, a relay unit to relay the non-CAMEL message to a service delivery framework based on the analyzing result, and a re-translator unit to re-translate a non-CAMEL response received from said service delivery framework into a standard CAMEL operation response, wherein said relay unit sends the re-translated response to an initiator of the received CAMEL-related message in a visited network.

11. The apparatus according to claim 10, wherein said service broker component further includes a blocking unit configured to alternatively block the received CAMEL-related message on the basis of the analyzing result.

12. The apparatus according to claim 10, wherein said service broker component further includes a trigger unit for triggering a service, which requires an interaction with a home network.

13. The apparatus according to claim 10, wherein said re-translator unit is configured to map received responses from non-CAMEL interfaces to responses with standard CAMEL-operations.

14. The apparatus according to claim 13, wherein said analyzing component is configured to further analyses the received responses; and the service broker component includes a filter unit for filtering said re-translated responses on the basis of this further analyzing result.

15. The apparatus according to claim 10, wherein said analyzing component is configurable by an operator.

16. The apparatus according to claim 10, wherein said relay unit is capable of changing the non-CAMEL message.

17. The apparatus according to claim 10, wherein the CAMEL-related message is an IDP or ERB operation.

18. The apparatus according to claim 10, wherein said tele-communication network is a mobile circuit switched network.

19. The apparatus according to claim 10, implemented in a mobile switching center server.

20. A computer program product having non-transitory computer-readable program code portions which, when loaded into a computer, are configured for performing the method steps according to claim 1.

* * * * *